(12) United States Patent
Duarte

(10) Patent No.: US 9,145,312 B2
(45) Date of Patent: Sep. 29, 2015

(54) ELECTROCHEMICAL APPARATUS

(75) Inventor: Carlos Filipe Duarte, Guildford (GB)

(73) Assignee: AGUACURE LIMITED, Guildford Surrey (GB)

( * ) Notice: Subject to any disclaimer, the term of this patent is extended or adjusted under 35 U.S.C. 154(b) by 131 days.

(21) Appl. No.: 13/880,603

(22) PCT Filed: Oct. 20, 2011

(86) PCT No.: PCT/GB2011/052034
§ 371 (c)(1),
(2), (4) Date: Sep. 23, 2013

(87) PCT Pub. No.: WO2012/052767
PCT Pub. Date: Apr. 26, 2012

(65) Prior Publication Data
US 2014/0008242 A1    Jan. 9, 2014

(30) Foreign Application Priority Data

Oct. 20, 2010   (GB) .................................. 1017725.1

(51) Int. Cl.
*C02F 1/46*     (2006.01)
*C02F 1/463*    (2006.01)
*C02F 1/461*    (2006.01)
(Continued)

(52) U.S. Cl.
CPC .............. *C02F 1/463* (2013.01); *C02F 1/46114* (2013.01); *C23F 13/04* (2013.01); *C23F 13/06* (2013.01); *C02F 2001/46133* (2013.01); *C02F 2201/4612* (2013.01); *C02F 2303/08* (2013.01); *C23F 2213/30* (2013.01)

(58) Field of Classification Search
USPC .................................. 205/742, 751, 744, 761
See application file for complete search history.

(56) References Cited

U.S. PATENT DOCUMENTS

| | | | |
|---|---|---|---|
| 3,972,796 | A | 8/1976 | Fröhler et al. |
| 4,048,045 | A | 9/1977 | Eng et al. |

(Continued)

FOREIGN PATENT DOCUMENTS

| | | |
|---|---|---|
| GB | 2440139 | 1/2008 |
| GB | 2442171 | 3/2008 |
| WO | 2008009973 | 1/2008 |

OTHER PUBLICATIONS

International Preliminary Report on Patentability issued in related International Patent Application No. PCT/GB2011/052034, mailed Apr. 23, 2013.

(Continued)

*Primary Examiner* — Arun S Phasge
(74) *Attorney, Agent, or Firm* — Meunier Carlin & Curfman LLC

(57) ABSTRACT

An electrochemical apparatus comprising: an electrochemical chamber; at least one cathode and at least one anode disposed within the chamber, said anode comprising a consumable surface for contact with liquid in the chamber, whereby, upon application of a potential difference across the cathode and anode, the consumable surface in contact with liquid in the chamber dissolves in the liquid; wherein the apparatus further comprises a protective electrode said protective electrode being connectable to the cathode and/or anode in the chamber via a source of direct current, such that electron flow takes place from the protective electrode to the cathode and/or anode in the chamber, said protective electrode being formed from a different material to the cathode or anode in the chamber.

9 Claims, 2 Drawing Sheets

Figure 1:
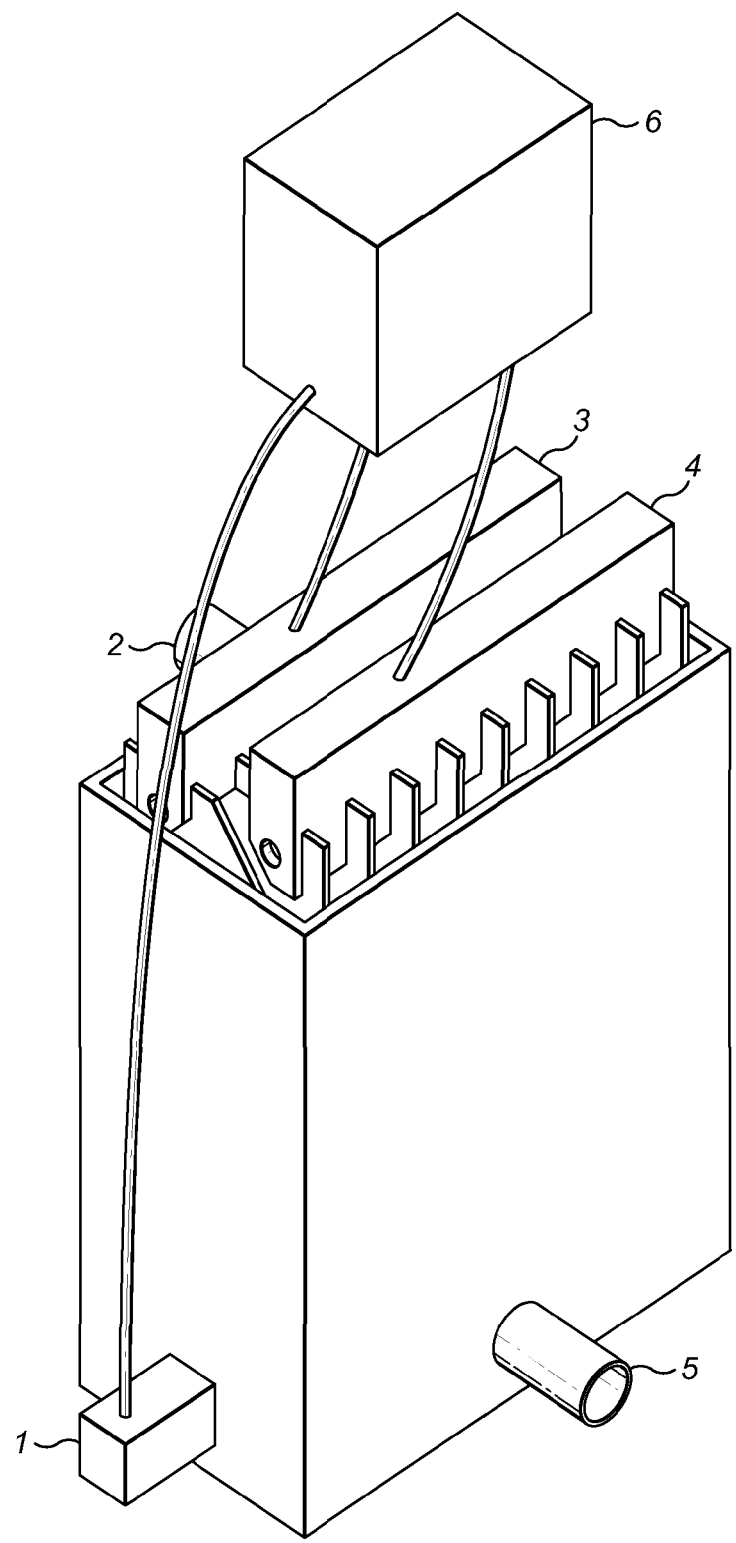

(51) Int. Cl.
*C23F 13/04* (2006.01)
*C23F 13/06* (2006.01)

(56) References Cited

U.S. PATENT DOCUMENTS 4,125,448 A * 11/1978 Roller .......................... 204/268
8,500,989 B2 * 8/2013 Wood et al. .................. 205/755

OTHER PUBLICATIONS

International Search Report in related International Patent Application No. PCT/GB2011/052034 mailed Jan. 17, 2012.
Search Report in related Application GB1017725.1 mailed Feb. 18, 2011.
Written Opinion issued in related International Patent Application No. PCT/GB2011/052034, mailed Apr. 23, 2013.

* cited by examiner

ELECTROCHEMICAL APPARATUS

The present invention relates to an electrochemical apparatus and, in particular, an electrocoagulation unit for removing contaminants from a liquid.

It is often necessary to remove contaminants from a liquid, especially water, to render the liquid suitable for use or discharge into the environment. Contaminants include metal ions, such as arsenic, chromium, copper, cadmium, nickel, lead and zinc; suspended solids, such as silt and clay; organic compounds, such as hydrocarbons; and salts, such as phosphates.

Various methods of removing contaminants from liquids are known. For example, a contaminated liquid may be treated with a coagulating agent, which reacts with the contaminants to form insoluble compounds that aggregate or flocculate to form larger particles. These larger particles can then be separated by physico-chemical methods, such as by settling, filtration and/or floatation.

As an alternative to chemical coagulation, contaminants can also be removed from liquids by electrocoagulation. Electrocoagulation is similar to chemical coagulation in that it relies on the reaction between a coagulating agent and the contaminants to form insoluble compounds, which aggregate or flocculate to form larger particles. With electrocoagulation, however, a potential is applied across a cathode (herein the working cathode or WCAT) and an anode (herein the working anode or WAN) to induce the corrosion of the WAN in the liquid under treatment. As a result, the WAN dissolves in the liquid, thereby releasing ions which act as the coagulating agent. The rate of corrosion and, hence, the rate of dosing, can be controlled by varying the current through the electrodes.

As discussed above, electrocoagulation relies on the electrode corroding or dissolving into the liquid under treatment. The corrosion of the electrode is essential to contaminant removal, as coagulation and flocculation cannot occur unless corrosion takes place. The electrodes of an electrocoagulation unit, therefore, require regular replacement and this adds to the cost of the overall process.

It is among the objects of embodiments of the present invention to provide an electrochemical apparatus that allows e.g. electrocoagulation to be carried out more cost-effectively. This is achieved by the counter-intuitive step of protecting the electrode(s) from corrosion. The present inventors, however, have identified a method of corrosion protection that does not compromise the electrode's ability to corrode and cause electrocoagulation.

FIG. 1 depicts an electrocoagulation unit comprising an electrochemical chamber having an inlet (5) and an outlet (2). An anodic buss bar (3) and a cathodic buss bar (4) are disposed within the chamber. The electrocoagulation unit also comprises a protective electrode (1) and a control unit (6), which contains a single source of direct current.

Figure 2:
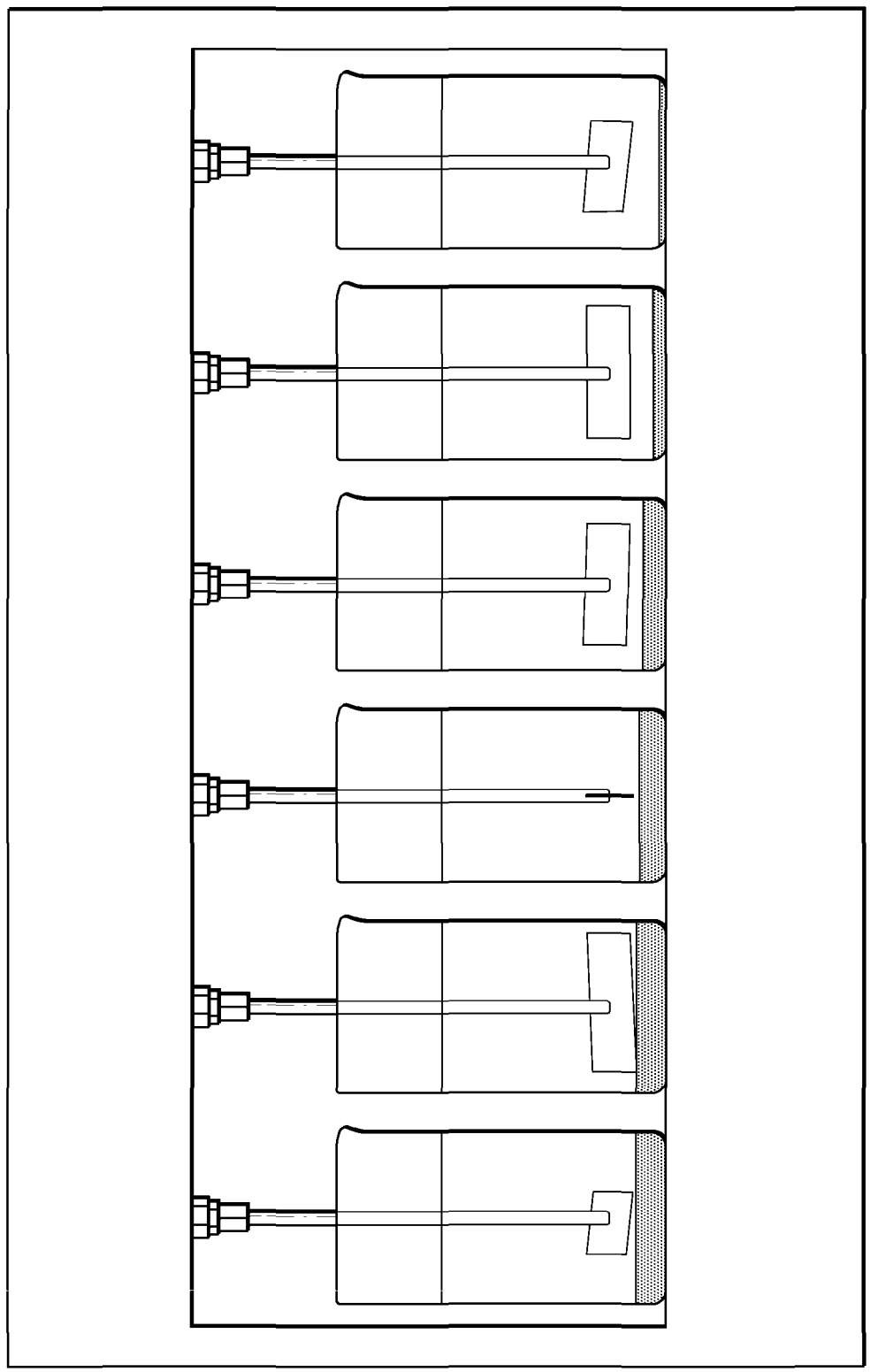

FIG. 2 depicts samples collected at various densities. An amount of settled floc can be seen at the bottom of each jar.

According to a first aspect of the present invention, there is provided an electrochemical apparatus comprising:
an electrochemical chamber;
at least one cathode (WCAT) and at least one anode (WAN) disposed within the chamber, said anode (WAN) comprising a consumable surface for contact with liquid in the chamber, whereby, upon application of a potential difference across the cathode (WCAT) and anode (WAN), the consumable surface in contact with liquid in the chamber dissolves in the liquid;
wherein the apparatus further comprises a protective electrode (ProElect), said protective electrode being connectable to the cathode (WCAT) and/or anode (WAN) in the chamber via a source of direct current, such that electron flow takes place from the protective electrode (ProElect) to the cathode (WCAT) and/or anode (WAN) in the chamber, said protective electrode (ProElect) being formed from a different material to the cathode (WCAT) or anode (WAN) in the chamber.

According to a second aspect of the present invention, there is provided a method for the electrochemical treatment of a liquid, said method comprising:
provision of an apparatus as described above;
introduction of a liquid into the chamber;
application of a potential difference across the cathode (WCAT) and anode (WAN) in the chamber, thereby causing the consumable surface of the anode (WAN) to dissolve in the liquid;
removal of the potential difference between the cathode (WCAT) and anode (WAN) of the electrocoagulation chamber;
electrical connection of the protective electrode (ProElect) to the cathode (WCA) and/or anode (WAN) of the electrocoagulation chamber; and
the passing of a direct current from the protective electrode (ProElect) and the cathode (WCAT) or the anode (WAN) of the electrocoagulation chamber, such that electron flow takes place from the protective electrode (ProElect) to the cathode (WCAT) and/or anode (WAN) in the chamber.

When a direct current is passed from the protective electrode (ProElect) to the cathode (WCAT) and/or anode (WAN) of the electrocoagulation chamber, an impressed flow of electrons takes place from the protective electrode (ProElect) to the cathode (WCAT) and/or anode (WAN) of the electrochemical chamber. Accordingly, in "protection mode", the protective electrode (ProElect) acts as the positive electrode (Protective Anode—ProAn), while the cathode (WCAT) and anode (WAN) of the electrochemical chamber act as the negative electrode (Protective cathode—ProCat) of the "protection" cell. This negative electrode (ProCat) is protected from corrosion by the impressed current, which reduces the negative electrode's susceptibility to oxidation. The effect is known as cathodic protection and is particularly important when the electrochemical apparatus is out of use, and no potential difference is applied across the anode (WAN) and cathode (WCAT) to deliberately effect corrosion of the anode (WAN). Under these conditions, the anode (WAN) and cathode (WCAT) of the electrochemical cell may be susceptible to natural corrosion, particularly if the liquid in the chamber contains contaminants that aid the corrosive process. This is undesirable, as it can lead to degradation of the electrode(s) without the benefit of e.g. effective electrocoagulation. The present invention can be used to reduce the risk of corrosion of the anode (WAN) and cathode (WCAT) particularly during such out-of-use periods, thereby increasing the longevity of the electrode(s) and the cost-effectiveness of e.g. the overall electrocoagulation process.

Advantageously, the protective electrode (ProElect) can also be used to protect the cathode (WCAT) and anode (WAN) of the electrochemical cell without compromising the ability of the anode (WAN) to corrode or dissolve upon application of a potential difference across the cathode (WCAT) and anode (WAN) of the electrochemical cell.

The apparatus of the present invention is preferably an electrocoagulation unit, whereby, upon application of a potential difference across the cathode (WCAT) and anode (WAN), the consumable surface in contact with liquid in the chamber dissolves to effect electrocoagulation.

As mentioned above, the electrochemical apparatus comprises an electrochemical chamber. Preferably, the chamber comprises an inlet through which liquid requiring treatment is introduced. The chamber may also include an outlet for the removal of liquid following treatment. In one embodiment, liquid is passed through the chamber in a substantially continuous process.

An anode (WAN) and cathode (WCAT) are disposed within the electrochemical chamber. For the avoidance of doubt, the anode (WAN) and cathode (WCAT) are distinct structural entities. For example, the anode and cathode may take the form of separate plates or rods that extend into the liquid contained in the electrochemical chamber. The anode (WAN) comprises a consumable surface, which, upon application of a potential difference across the anode (WAN) and cathode (WCAT), dissolves in the liquid. In a preferred embodiment, the dissolved anode material acts as a coagulating agent. The coagulating agent preferably reacts with contaminants in the liquid to form insoluble compounds that aggregate or flocculate to form larger particles. These larger particles can then be separated from the remainder of the liquid by conventional separation techniques, such as (but not exclusively) settling, decanting, filtration and/or floatation. A combination of two or more of these techniques may also be employed.

Preferably, a group of cathodes (e.g. series of plates) and a group of anodes (e.g. series of plates) are employed in the electrochemical chamber. The group of cathodes and group of anodes may be connectable to each other via a single source of direct current. Alternatively, multiple sources of direct current may be used.

The cathode(s) and anode(s) of the electrochemical cell (WCAT and WAN) may be formed of any suitable material. For example, the anode(s) and/or the cathode(s) may comprise of at least one of the following: aluminium, iron, steel, stainless steel, copper, graphite, reticulated vitreous carbon and a dimensionally stable electrode (e.g. alloy). The cathode(s) and anode(s) may be formed of the same material. For example, both the cathode(s) and anode(s) may be formed of aluminium, steel and/or iron. Alternatively, the cathode(s) and anode(s) may be formed of different materials. In one embodiment, the cathode(s) comprises iron (e.g. steel) which in this instance serves as a pseudo-dimensionally stable material, while the anode(s) from which the floc is generated comprises aluminium.

Other suitable cathode/anode combinations include aluminium/aluminium, iron/dimensionally stable electrode and aluminium/dimensionally stable electrode.

The apparatus may include a source of direct current that can be used to pass a direct current between the cathode(s) (WCAT) and anode(s) (WAN) in the electrochemical chamber.

As mentioned above, the apparatus further comprises a protective electrode (ProElect) and a source of direct current. The protective electrode (ProElect) may be connected to the cathode(s) (WCAT) and/or anode(s) (WAN) in the chamber via the source of direct current, such that electron flow takes place from the protective electrode (ProElect) to the cathode(s) (WCAT) or anode(s) (WAN) in the chamber. This flow of electrons (or impressed current) protects the cathode(s) (WCAT) and/or anode(s) (WAN) in the chamber from corrosion. In one embodiment, it is the anode(s) (WAN) in the chamber which is protected by the impressed current. In another embodiment, it is the cathode(s) (WCAT) in the chamber that is protected by the protective electrode.

In a preferred embodiment, both the cathode(s) and the anode(s) in the chamber are protected from corrosion. For example, the apparatus may comprise a first protective electrode(s) for connection to the cathode(s) in the chamber, and a second protective electrode(s) for connection to the anode(s) in the chamber. Preferably, the anode(s) and cathode(s) are coupled to the same protective electrode(s). When the cathode(s) and anode(s) are connected to their respective protective electrodes via source(s) of direct current, electrons flow from the respective protective electrodes (ProElect) to the cathode(s) and anode(s). This flow of electrons or impressed current protects the cathode(s) and anode(s) in the chamber from corrosion.

In one embodiment, the cathode(s) and/or anode(s) in the chamber may be over-protected by passing a relatively large current between the cathode(s)/anode(s) and their protective electrodes(s). Over protection occurs when the impressed (protection) current, $i_{prot}$, is greater than the current required to balance the corrosion current, $i_{corr}$, and achieve a negligible rate of corrosion, leading to a shift of the electrode potential to a region where hydrogen evolution occurs. When the liquid in the chamber is an aqueous solution, this may cause hydrogen to evolve at the cathode(s)/anode(s). This evolution of gas may help to clean any unwanted deposits from the surface of the cathode(s) and/or anode(s). The electrochemical apparatus may include a gas collector for collecting any gas (e.g. hydrogen) produced in the electrochemical apparatus, for example, during the electrocoagulation and/or electrode protection process.

Any suitable current may be passed between the protective electrode(s) and the cathode(s) (WCAT) or anode(s) (WAN) of the electrochemical chamber such that the system is maintained below its characteristic corrosion potential ($E_{corr}$) such that a negligible rate of electrode corrosion is achieved. Typical values range from 7 to 23 mA (approximately 6-20 $\mu A/cm^2$) on the size of system presented in the example. These values will be dependant on the electrode material being protected and the liquid in contact with the electrodes.

Preferably over protection is avoided by limiting the electrode surface potential to within the range of ±25 mV from the protection potential, more preferably within the range of 0 and −25 mV of the protection potential.

For example, in the case of mild steel, over protection is avoided by limiting the electrode surface potential to be as close to the −800 mV (as measured against a reference electrode of Ag/AgCl/0.5 M KCl) protection potential as possible and not greatly exceeding −825 mV (vs. Ag/AgCl/0.5 M KCl).

Since in practice the corrosion of mild steel in near neutral liquids becomes very low at potentials more negative than −775 mV, control of the surface potential of the plate pack in the range −775 to −800 mV Ag/AgCl/0.5 M KCl will provide optimum combination of corrosion mitigation and safe operation. Typically, for near-neutral and alkaline liquids at ambient temperatures and minimal flow rate, to achieve corrosion mitigation the current density preferably is from 10 to 200 mA/m², more preferably from 30 to 200 mA/m², even more preferably from 45 to 200 mA/m², still even more preferably from 60 to 200 mA/m². Higher protection currents may be required for liquids within the acidic pH range.

For clarity, the preferred protection potential (and therefore the required current density) depends on the characteristics of the electrode pack (e.g. size, material, gap) and liquid (e.g. pH, conductivity, temperature), therefore requiring defining for each system.

The protective electrode(s) (ProElect) may be formed of any suitable material. Preferably, the protective electrode(s)

(ProElect) is formed from a different material to the anode(s) and/or cathode(s) in the chamber. In one embodiment, the protective electrode(s) is formed of a noble metal, such as platinum, or any commercially available dimensionally stable electrode (e.g titanium coated electrodes, lead dioxide and diamond coated electrodes). Groups of protective electrodes (e.g. series of plates) may be employed. These may be coupled to the cathode(s) and/or anode(s) via one or more sources of direct current. The one or more sources of direct current may form part of the electrochemical apparatus.

Preferably, the protective electrode is present in the same chamber in liquid contact, directly or via a liquid bridge, with the anode(s) (WAN) and cathode(s) (WCAT).

Any suitable current may be passed between the cathode(s) (WCAT) and anode(s) (WAN) of the electrochemical chamber. Typical values range from 1 to 10 A (0.5-5 mA/cm$^2$) for the size of system presented in the example.

The electrochemical apparatus, and, in particular, the electrocoagulation unit may be used to treat any liquid that can function as an electrolyte for the electrochemical apparatus. Suitable liquids include aqueous solutions, such as seawater, brackish water, river water and lake water. The liquid may also be a waste water stream, such as an industrial, agricultural or domestic waste water stream.

The electrochemical apparatus, and, in particular, the electrocoagulation unit may be used for the removal of any suitable species, such as dissolved ions and/or organic material. For example, the electrochemical apparatus and, in particular, the electrocoagulation unit may be used to remove inorganic anions, such as phosphate and/or metal ions, such as nickel and heavy metal ions (Hg, Cr and Pb) from the liquid under treatment. The apparatus and, in particular, the electrocoagulation unit may be used to reduce the chemical oxygen demand (COD), biological oxygen demand (BOD) and/or concentration of suspended solids (TSS) in the liquid under treatment.

In one embodiment the electrochemical apparatus may include a control unit containing a single source of direct current, said source being connected to the cathode and anode(s) to effect electrocoagulation, or the protective electrode and the cathode and/or anode(s) in the chamber to effect protection. In another embodiment the electrochemical apparatus may include a control unit containing a source of direct current that is connected to the cathode(s) and anode(s) to effect electrocoagulation and a second source of direct current that is connected to the protective electrode and the cathode(s) and/or anode(s) in the chamber to effect protection.

In a preferred embodiment, the electrochemical apparatus is an electrocoagulation unit described in WO 2008/009973. This electrocoagulation unit comprises an electrode chamber, which, in use, has a top and a bottom, the chamber having a fluid inlet at or towards its bottom and being in fluid communication with at least one discharge conduit towards its top to direct fluid from the chamber towards a fluid outlet; and an electrode module removable through the top of the electrode chamber and including a support body supporting a plurality of electrodes, the electrode chamber and the electrode module co-operating with one another to restrict the flow of contaminated liquid to regions within the electrode chamber adjacent active surfaces of the electrodes.

These and other aspects of the invention are now described with reference to FIG. 1.

FIG. 1 depicts an electrocoagulation unit comprising an electrochemical chamber having an inlet (5) and an outlet (2). An anodic buss bar (3) and a cathodic buss bar (4) are disposed within the chamber. The electrocoagulation unit also comprises a protective electrode (1) and a control unit (6), which contains a single source of direct current.

To use the unit for electrocoagulation, a liquid requiring treatment is introduced into the chamber via the inlet (5). To effect electrocoagulation, the anodic buss bar (3) is connected to the cathodic buss bar (4) via the control unit (6). This causes the consumable surfaces of the anodes to dissolve in the liquid and generate a floc. The treated liquid may then be removed via the outlet (2) for further purification, for example, by filtration.

When the unit is not used for electrocoagulation, the anodes or cathodes in the chamber may be protected from corrosion by connecting the anodic buss bar (3) or cathodic buss bar (4) to the protective electrode (1) via the control unit (6). This causes electrons to flow from the protective electrode (1) to the cathodes or anodes in the chamber, protecting them from corrosion.

EXAMPLES

To test the effectiveness of using an impressed current to protect an electrode in the context of electrocoagulation, a set of mild steel electrodes commonly used in wastewater treatment trials was kept in seawater (a highly corrosive environment) under cathodic protection. Mass loss due to corrosion was compared against an unprotected control sample also kept in seawater.

Table 1 presented below summarises the experimental settings and respective results. In the "Protected Cathode" and "Control" columns present the loss of electrode mass (as iron (Fe)) which is expressed in micrograms (µg) lost per unit electrode area (cm$^2$) per hour alongside the current density, J, employed up to the respective sampling time ($T_{xxx}$) which is expressed in micro ampere (µA) per unit electrode area (cm$^2$).

TABLE 1

Summary of experimental results and settings of experiment on electrocoagulation electrodes.

| | Protected Cathode | | Control | |
| --- | --- | --- | --- | --- |
| Sample$_{min}$ | J (µA/cm$^2$) | Mass Lost (µg/cm$^2$/h) | J (µA/cm$^2$) | Mass Lost (µg/cm$^2$/h) |
| $T_{0\ (seawater)}$ | 0 | 0 | Open circuit | 0 |
| $T_{45}$ | 20.1 | 0 | Open circuit | 20.6 |
| $T_{1020}$ | 20.1 | 0.26 | Open circuit | 4.2 |
| $T_{2505}$ | 6.1 | 0.11 | Open circuit | 4.0 |

Analysis of the seawater samples used during testing at the starting point ($T_0$) showed that no detectable levels of iron were present. After 45 minutes ($T_{45}$) 17.64 mg of iron was detected in the control sample whereas iron remained below detectable levels in the protected sample held at 20.1 µA/cm$^2$. Further sampling 17 hours later ($T_{1020}$) detected 81.36 mg of Fe in the control sample compared to 5.13 mg detected in the protected sample. At 41.75 hours ($T_{2505}$) from start, 191.52 mg of iron were detected in the control sample whilst the iron content in the protected sample remained stable (5.22 mg) despite the reduction in current density to 6.1 µA/cm$^2$.

The figures equate to a mass loss rate of 4.0 µg/cm$^2$/h for unprotected electrodes, 36 times greater than the rate of mass loss calculated for the protected electrodes (0.11 µg/cm$^2$/h). It is worth noting that the iron content in the protected samples is believed to originate from solid residue (dust), generated during sample preparation, being dislodged from the plate surface in the course of testing as a result of gas evolution rather than corrosion of the plates.

This behaviour highlights a further benefit resulting from implementation of the present invention. At over-protection conditions, where hydrogen is generated at the electrode surface, a mechanical cleaning effect is seen as gas bubbles physically dislodge sediment deposited on the electrode surface.

This is a significant benefit in the context of electrocoagulation as it provides an electrochemical, in situ, mechanism for electrode cleaning.

Example 2

Further testing was carried out to determine if cathodic protection by the application of an impressed current interfered with the electrodes ability to release iron and generate floc following a period under protection. This was carried out by evaluating floc generation at various current densities in seawater containing suspended solids and using a set of electrodes previously held for 48hours in seawater under the cathodic protection with an impressed current.

Table 2 below summarises the current densities employed during testing whilst FIG. 2 presents the samples collected at each current density (Samples 1 to 5 shown from left to right). An amount of settled floc can be seen at the bottom of each jar.

TABLE 2 summary of trial settings and results during evaluation of electrodes following ICCP period

| Sample | current density (mA/cm²) | Turbidity (NTU) |
| --- | --- | --- |
| 1 | 10.82 | 7.31 |
| 2 | 9.74 | 7.81 |
| 3 | 8.66 | 7.82 |
| 4 | 7.53 | 9.22 |
| 5 | 6.49 | 16.70 |

As would be expected under normal circumstances, the amount of floc generated increased with increasing current density, confirming that despite being under cathodic protection for 48 hours prior to testing, no interference effect was recorded.

The foregoing detailed description has been provided by way of explanation and illustration and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for the electrochemical treatment of a liquid, said method comprising:

providing electrochemical apparatus comprising:
an electrochemical chamber;
at least one cathode and at least one anode disposed within the chamber, said anode comprising a consumable surface for contact with liquid in the chamber, whereby, upon application of a potential difference across the cathode and anode, the consumable surface in contact with liquid in the chamber dissolves in the liquid;
wherein the apparatus further comprises a protective electrode, said protective electrode being connectable to the cathode and/or anode in the chamber via a source of direct current, such that electron flow takes place from the protective electrode to the cathode and/or anode in the chamber, said protective electrode being formed from a different material to the cathode or anode in the chamber;
introducing liquid into the chamber;
applying a potential difference across the cathode and anode in the chamber, thereby causing the consumable surface of the anode to dissolve in the liquid;
removing the potential difference between the cathode (WCAT) and anode of the chamber;
electrically connecting the protective electrode to the cathode and/or anode of the chamber; and
passing of a direct impressed current from the protective electrode and the cathode or the anode of the chamber, such that electron flow takes place from the protective electrode to the cathode or anode in the chamber,
wherein the impressed current is greater than the minimum current required to provide protection for the cathode or anode of the chamber against corrosion.

2. The method of claim 1, wherein the liquid is an aqueous solution and hydrogen is evolved at the cathode or anode.

3. The method of claim 1, wherein the apparatus is an electrocoagulation unit, whereby, upon application of a potential difference across the cathode and anode, the consumable surface in contact with liquid in the chamber dissolves to effect electrocoagulation.

4. The method of claim 1, wherein the apparatus comprises liquid in the chamber.

5. The method of claim 1, wherein the protective electrode is disposed within the chamber.

6. The method of claim 1, wherein the protective electrode is formed from a different material than the anode and/or the cathode.

7. The method of claim 1, wherein the anode and/or the cathode comprise(s) a material selected from the group consisting of aluminium, iron, steel, stainless steel, copper, graphite, reticulated vitreous carbon, a dimensionally stable alloy, and combinations thereof.

8. The method of claim 1, wherein the protective electrode comprises a noble metal and/or an alloy.

9. The method of claim 1, further comprising a separation unit downstream of the electrochemical cell.

* * * * *